US012811681B2

(12) United States Patent
Masumoto et al.

(10) Patent No.: US 12,811,681 B2
(45) Date of Patent: Nov. 24, 2026

(54) OPTICAL TRANSMISSION SYSTEM, TRANSMISSION METHOD OF OPTICAL TRANSMISSION SYSTEM, AND COMMUNICATION DEVICE

(71) Applicant: NTT, Inc., Tokyo (JP)

(72) Inventors: Kana Masumoto, Musashino (JP); Takeshi Seki, Musashino (JP); Toshiya Matsuda, Musashino (JP)

(73) Assignee: NTT, Inc., Tokyo (JP)

( * ) Notice: Subject to any disclaimer, the term of this patent is extended or adjusted under 35 U.S.C. 154(b) by 158 days.

(21) Appl. No.: 18/837,955

(22) PCT Filed: Feb. 22, 2022

(86) PCT No.: PCT/JP2022/007119

§ 371 (c)(1),
(2) Date: Aug. 13, 2024

(87) PCT Pub. No.: WO2023/161976

PCT Pub. Date: Aug. 31, 2023

(65) Prior Publication Data

US 2025/0158708 A1 May 15, 2025

(51) Int. Cl.
*H04B 10/079* (2013.01)
*H04B 10/564* (2013.01)

(52) U.S. Cl.
CPC ..... *H04B 10/07955* (2013.01); *H04B 10/564* (2013.01)

(58) Field of Classification Search
CPC ........................ H04B 10/564; H04B 10/07955
See application file for complete search history.

(56) References Cited

U.S. PATENT DOCUMENTS

| | | | | |
|---|---|---|---|---|
| 7,292,785 B2 * | 11/2007 | Tomooka | H04J 14/0286 398/79 |
| 2014/0079385 A1 * | 3/2014 | Shukunami | H04B 10/0775 398/16 |
| 2014/0177657 A1 | 6/2014 | Bowcutt et al. | |
| 2021/0041648 A1 * | 2/2021 | Maruyama | H04B 10/564 |

FOREIGN PATENT DOCUMENTS

| | | |
|---|---|---|
| EP | 3163768 | 5/2017 |
| JP | 2006-33442 | 2/2006 |
| JP | 2017-523698 | 8/2017 |

OTHER PUBLICATIONS

[No Author Listed], "Open ROADM MSA Device White Paper," OpenROADM, Nov. 2020, 212 pages.

* cited by examiner

*Primary Examiner* — David C Payne
(74) *Attorney, Agent, or Firm* — Fish & Richardson P.C.

(57) ABSTRACT

An optical transmission system includes a reconfigurable optical add-drop multiplexer device that transmits and receives an optical signal via an optical transmission line, and a communication device connected to the ROADM device via the optical transmission line. The ROADM device includes an SFP for OSC that converts an electrical signal and an optical signal to each other, and transmits and receives the optical signal via the optical transmission line. The communication device includes a response unit that returns back to the ROADM device the optical signal transmitted from the ROADM device.

12 Claims, 13 Drawing Sheets

OPTICAL TRANSMISSION SYSTEM, TRANSMISSION METHOD OF OPTICAL TRANSMISSION SYSTEM, AND COMMUNICATION DEVICE

CROSS-REFERENCE TO RELATED APPLICATIONS

This application is a National Stage application under 35 U.S.C. § 371 of International Application No. PCT/JP2022/007119, having an International Filing Date of Feb. 22, 2022.

The disclosure of the prior application is considered part of the disclosure of this application, and is incorporated by reference in its entirety into this application.

TECHNICAL FIELD

The present invention relates to an optical transmission system, a transmission method of the optical transmission system, and a communication device.

BACKGROUND ART

In recent years, a reconfigurable optical add-drop multiplexer (ROADM) has been studied as a path management technology of efficiently operating an optical communication network. The ROADM is configured as, for example, an optical mesh network in which a plurality of ROADM devices are connected in a mesh shape by optical fibers and ROADM nodes are formed.

Each ROADM device has an add/drop function of branching/inserting any optical signal from a wavelength division multiplexing (WDM) signal that has been wavelength-multiplexed from a plurality of paths, and a routing function of switching a path to any path.

The ROADM device generally has a function of transmitting and receiving a monitoring control signal (hereinafter, this is also referred to as an optical supervisory channel (OSC)). In an optical transmission system, the OSC performs communication check of an optical fiber, optical power management of a signal, and management of wavelength information by passing through an amplifier circuit or a wavelength selective switch (WSS) using OSC light.

In the future, in a case where a highly flexible network configuration is required in the optical communication network and the number of electricity termination points is reduced, it is conceivable that the ROADM device performs optical communication without electrical termination with a device other than a ROADM device. In this case, a device that is not a ROADM device is considered as a device that does not have the OSC.

A main function of the OSC included in the ROADM device is to manage conduction of an optical signal in a transmission/reception unit of each ROADM device, and to perform auto power shut down (APSD) to automatically cut off conduction when an optical signal is blocked in an optical transmission line. The conduction management of the OSC has a function of not only cutting off conduction but also recovering conduction.

In a general ROADM device, optical power management and wavelength information management of each section can be performed by using the OSC. Therefore, in the ROADM device, an amplifier circuit, a variable optical attenuator (VOA), and a WSS are appropriately controlled (for example, see Non Patent Literature 1).

CITATION LIST

Non Patent Literature

Non Patent Literature 1: "Open ROADM MSA Device White Paper", [online], [retrieved on Feb. 4, 2022], the Internet <http://openroadm.org/download.html>

SUMMARY OF INVENTION

Technical Problem

In a case where communication between ROAD devices is performed on the basis of an Open ROADM Multi-Source Agreement (MSA), the OSC is essential in order to perform communication check or conduction management in communication between the ROADM devices.

On the other hand, when communication is performed between a ROADM device and a communication device different from a ROADM device (a communication device having no OSC), optical connection is performed without electrically terminating the network, and this is detected as an error in a monitoring control unit, and communication cannot be performed.

In this case, it is conceivable that the simplest solution is to stop the OSC of the ROADM device. However, OSC light used in the OSC is also used for checking optical conduction. The ROADM device is generally used in a core network, and performs communication using a high-power optical signal. Therefore, when the OSC is stopped by the ROADM device, a high-power optical signal is used as a signal at the time of optical conduction, and it is assumed that the safety of the operator cannot be secured. The OSC function is defined as a configuration of Open ROADM MSA, and cannot be stopped as a function.

Furthermore, it is also conceivable to communicate with a device of another system via an optical multiplexer/demultiplexer included in the ROADM device. However, in this case, there is a requirement that two communicating devices (the ROADM device and a device in a different system) need to exist in the same place.

The present invention has been made in view of such a problem, and an object of the present invention is to provide an optical transmission system, a transmission method of the optical transmission system, and a communication device that enable optical communication without electrically terminating a device of another system while securing the OSC function of the ROADM device.

Solution to Problem

An optical transmission system according to the present invention is an optical transmission system including: an optical transmission device that transmits and receives an optical signal via an optical transmission line; and a communication device connected to the optical transmission device via the optical transmission line, wherein the optical transmission device includes a small form factor pluggable transceiver (SFP) that converts an electrical signal and an optical signal to each other and transmits and receives the optical signal via the optical transmission line, and the communication device includes a response unit that returns back the optical signal transmitted from the optical transmission device to the same optical transmission device.

Advantageous Effects of Invention

According to the present invention, it is possible to provide an optical transmission system, a transmission method of the optical transmission system, and a communication device that enable optical communication without electrically terminating a device of another system while securing an OSC function of a ROADM device.

DESCRIPTION OF EMBODIMENTS

Figure 1:
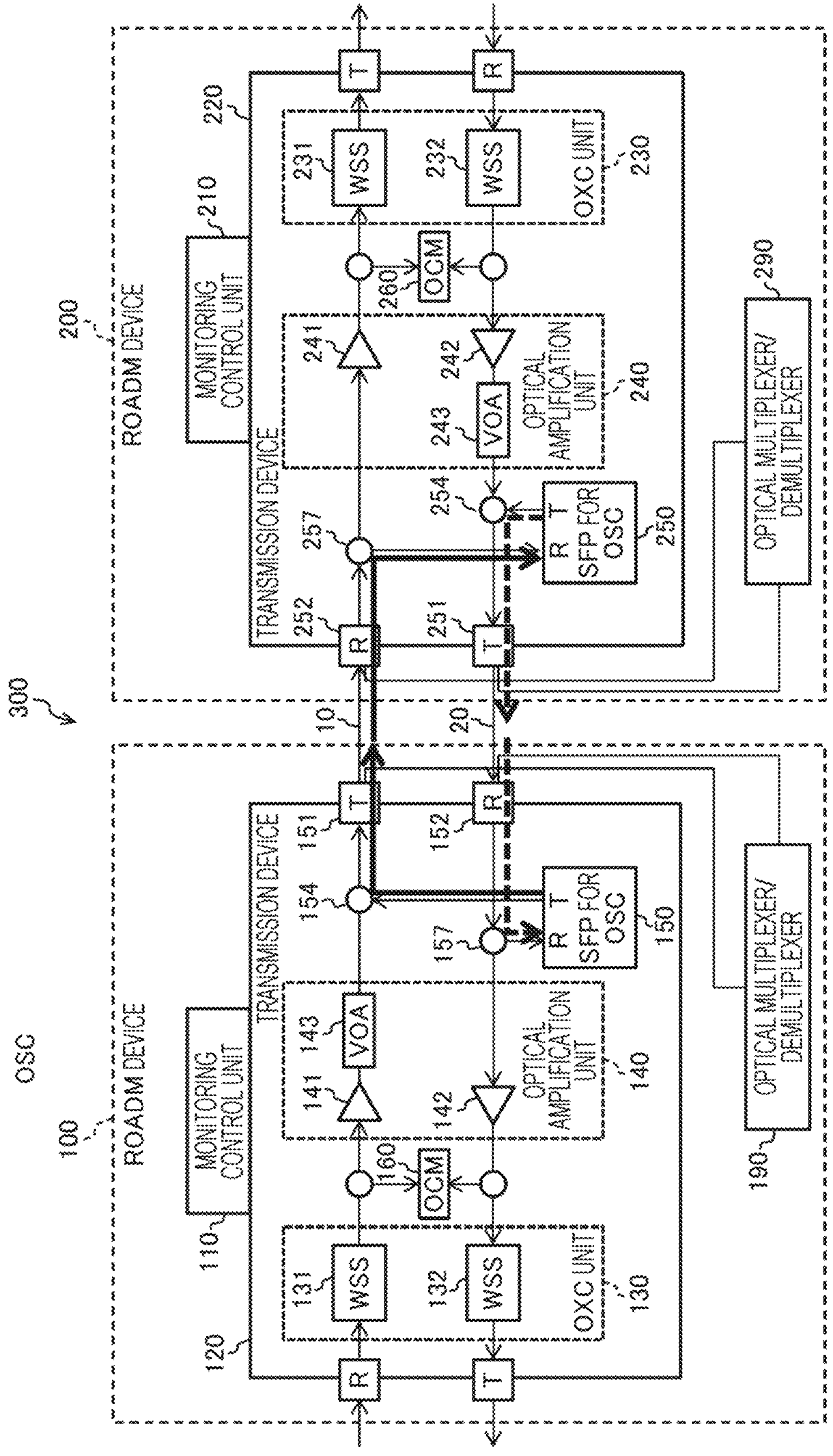
FIG. 1 is an explanatory diagram illustrating a configuration when communication is performed between ROADM devices according to a conventional technology as a comparative example of an embodiment of the present invention.

Next, a mode for carrying out the present invention (hereinafter, referred to as the "present embodiment") is described. First, an outline of the present technology is described using the related art as a comparative example. Note that the same components are denoted by the same reference numerals, and the description thereof is omitted as appropriate.

Outline of Present Technology: Comparative Example 1

FIG. 1 is an explanatory diagram illustrating a configuration when communication is performed between reconfigurable optical add-drop multiplexer (ROADM) devices according to a conventional technology as a comparative example of the present embodiment.

As illustrated in FIG. 1, an optical transmission system 300 of Comparative Example 1 includes a ROADM device 100 and a ROADM device 200. As an example, the ROADM device 100 and the ROADM device 200 are constituted by the same optical transmission device, and are respectively connected by optical transmission lines 10 and 20 constructed by optical fibers.

The ROADM device 100 includes a monitoring control unit 110, a transmission device 120, and an optical multiplexer/demultiplexer 190. The transmission device 120 includes an optical cross connect (OXC) unit 130, an optical amplification unit 140, a small form factor pluggable transceiver (SFP) for optical supervisory channel (OSC) 150, a transmission unit 151, a reception unit 152, and an optical channel monitor (OCM) 160.

The OXC unit 130 includes a wavelength selective switch (WSS) 131 and a WSS 132. The OXC unit 130 sets an optical communication path for data transfer in the optical transmission lines 10 and 20. The OXC unit 130 outputs a predetermined data signal to a predetermined data transmission path in a case where there is a data transmission path having a different format for each use or transmission speed. For example, the OXC unit 130 sets a data transmission path as an optical communication path for each data center or network service provider.

The WSS 131, 132 has, for example, an N-input 1-output (N×1) or 1-input N-output (1×N) Mux/Demux function, and outputs each WDM signal from an input port to any output port.

The OXC unit 130 may include an arrayed-waveguide grating (AWG) (not illustrated) and a transponder (not illustrated). In this case, the OXC unit 130 outputs a predetermined optical signal from the transponder via the arrayed waveguide diffraction grating as the output of the WSS 131, 132.

The optical amplification unit 140 includes a post-amplifier 141, a pre-amplifier 142, and a variable optical attenuator (VOA) 143.

The post-amplifier 141 is an optical amplifier that collectively amplifies an optical level of the WDM signal to be multiplexed and output to the optical transmission line 10. The pre-amplifier 142 is an optical amplifier that collectively amplifies the optical level of the WDM signal attenuated by the optical transmission line 20.

The VOA 143 is a variable optical attenuator that has an optical attenuation function and adjusts an intensity of an optical signal for each wavelength. The VOA 143 is disposed on the transmission side, and adjusts the intensity of the optical input according to characteristics of the optical path of the optical transmission line 10 such as a difference in amplification factor for each channel and wavelength characteristics of transmission line loss. As a result, the VOA 143 suppresses variation in the intensity of the signal for each channel and makes the optical output on the reception side constant.

The OCM 160 measures a wavelength spectrum of an optical signal input from the VOA 143 of the optical amplification unit 140. In addition, the OCM 160 measures a wavelength spectrum of the optical signal output from the pre-amplifier 142 of the optical amplification unit 140.

The SFP for OSC 150 mutually converts an electrical signal and an optical signal, and transmits and receives the optical signal via the optical transmission lines 10 and 20. The SFP for OSC 150 transmits an optical signal from the transmission unit 151 constituting the output unit to the ROADM device 200, and receives the optical signal transmitted from the ROADM device 200 using the reception unit 152 constituting the input unit. The SFP for OSC 150 has a transmission terminal T and a reception terminal R.

The monitoring control unit 110 measures optical power of the received OSC light at the transmission unit 151, the reception unit 152, the reception terminal R of the SFP for OSC 150, and the OCM 160 before and after the optical amplification unit 140 (alternatively, before and after the WSS 131, 132). The monitoring control unit 110 constantly monitors while measuring optical power, and performs auto power shut down (APSD) for automatically cutting off conduction when signal interruption is confirmed.

The OCM 160 may measure not only the wavelength spectrum but also the optical power, and transmit the measurement result to the monitoring control unit 110.

On the optical signal (that is, a signal of OSC light), main signal information (used wavelength, number of wavelengths, noise information, span loss, and the like) is superimposed, and the ROADM device 100 and the ROADM device 200 communicate with each other to transmit and receive the information. The monitoring control unit 110 issues an instruction on the basis of transmission and reception state of the information, and performs amplifier control (amplification control) and WSS control (wavelength selection control) of the optical amplification unit 140. The main signal to information is also referred to as a monitoring control signal.

The optical multiplexer/demultiplexer 190 includes an optical circuit (not illustrated) that demultiplexes input light into a plurality of pieces and outputs the plurality of pieces of input light, and an optical circuit (not illustrated) that multiplexes the plurality of pieces of input light and outputs the multiplexed light.

In the present embodiment, the SFP for OSC 150 includes an optical module, and the SFP for OSC 150 and the monitoring control unit 110 constitute a function of OSC (corresponding to an OSC function unit). The SFP for OSC 150 is an example of an SFP for performing optical communication. Functions of the OSC including the SFP for OSC 150 and the monitoring control unit 110 mainly perform three controls.

In the first control, the monitoring control unit 110 checks communication of optical signals at the transmission unit 151, the reception unit 152, and the reception terminal R of the ROADM device 100, and executes APSD when the optical signal is blocked. In the second control, the transmission device 120 measures optical power for optical power management. In the third control, the OCM 160 measures a wavelength spectrum for management of wavelength information.

The optical transmission line 10 transmits an optical signal from the ROADM device 100 to the ROADM device 200. The optical transmission line 20 transmits an optical signal from the ROADM device 200 to the ROADM device 100. The monitoring control signal is superimposed on the optical signals communicated through the optical transmission lines 10 and 20.

In the present embodiment, the monitoring control unit 210 of the ROADM device 200 corresponds to the monitoring control unit 110 of the ROADM device 100, and the transmission device 220 of the ROADM device 200 corresponds to the transmission device 120 of the ROADM device 100. The OXC unit 230 of the transmission device 220 corresponds to the OXC unit 130 of the transmission device 120, the optical amplification unit 240 of the transmission device 220 corresponds to the optical amplification unit 140 of the transmission device 120, and the SFP for OSC 250 of the transmission device 220 corresponds to the SFP for OSC 150 of the transmission device 120. The optical multiplexer/demultiplexer 290 of the ROADM device 200 corresponds to the optical multiplexer/demultiplexer 190 of the ROADM device 100.

The optical coupler 154, 157 and the optical coupler 254, 257 are couplers that branch or couple optical signals, and are appropriately provided in the transmission device 120, 220.

In the comparative example illustrated in FIG. 1, in the ROADM device 100, the SFP for OSC 150 transmits an optical signal from the transmission terminal T to the ROADM device 200 via the transmission unit 151 and the optical transmission line 10. On the other hand, in the ROADM device 200, the SFP for OSC 250 receives an optical signal via the optical transmission line 10 and the reception unit 252 at the reception terminal R.

In the ROADM device 200, the SFP for OSC 250 transmits an optical signal from the transmission terminal T to the ROADM device 100 via the transmission unit 251 and the optical transmission line 20. On the other hand, in the ROADM device 100, the SFP for OSC 150 receives an optical signal via the optical transmission line 20 and the reception unit 152 at the reception terminal R.

Comparative Example 2

Figure 2:
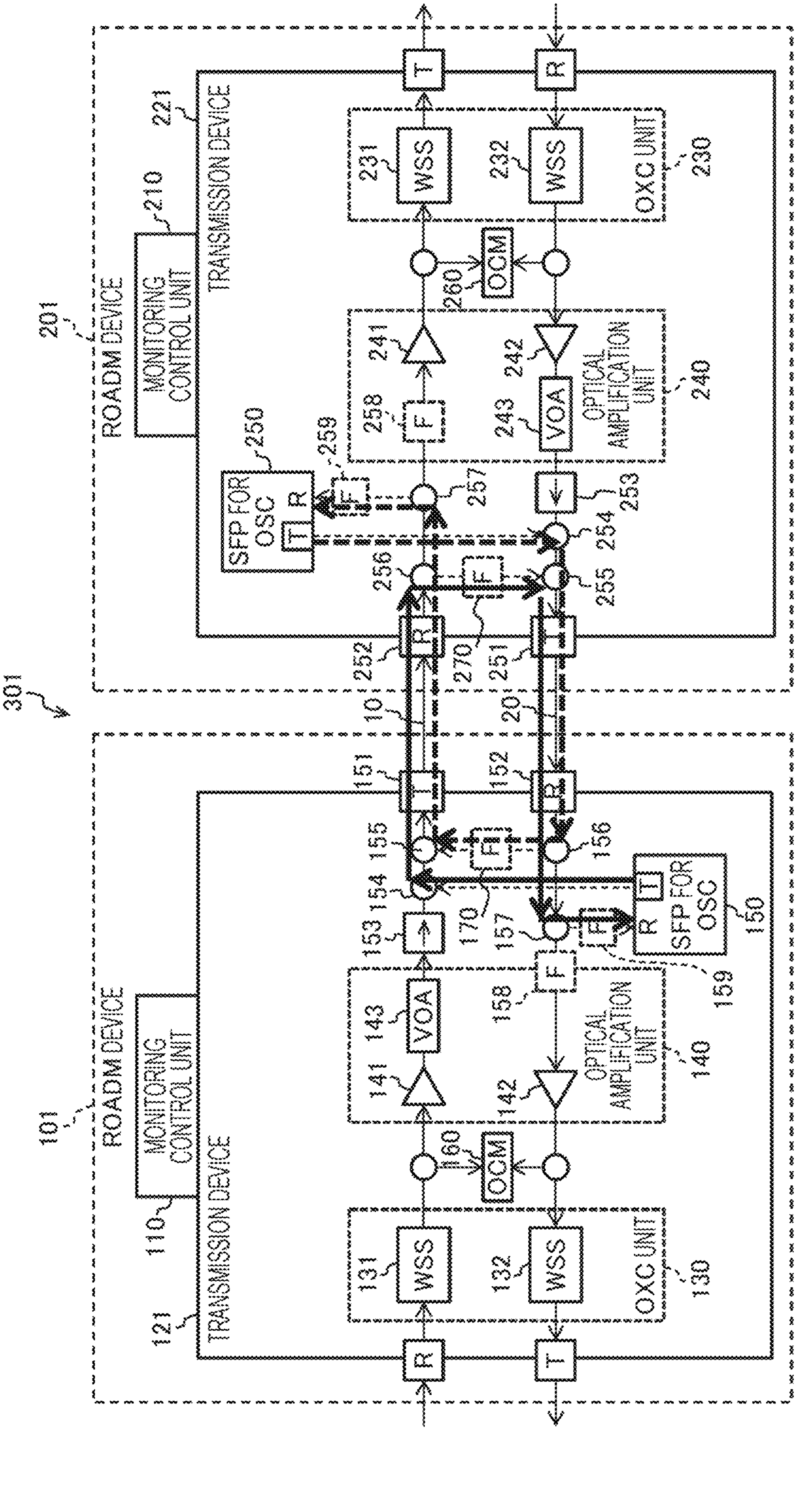
FIG. 2 is an explanatory diagram illustrating a configuration when conventional ROADM devices communicate with each other in a return back configuration using an OSC function as a comparative example of an embodiment of the present invention.

FIG. 2 is an explanatory diagram illustrating a configuration when conventional ROADM devices communicate with each other in a return back configuration by an OSC function as a comparative example of the present embodiment. The optical multiplexer/demultiplexer 190 and the optical multiplexer/demultiplexer 290 illustrated in FIG. 1 are not related to the control of the present embodiment, and thus are not illustrated.

As illustrated in FIG. 2, the optical transmission system 301 includes a ROADM device 101 and a ROADM device 201. In the optical transmission system 301, as in FIG. 1, the ROADM device 101 and the ROADM device 201 are constituted by the same optical transmission device, and are connected by optical transmission lines 10 and 20 constituted by optical fibers.

The transmission device 121 of the ROADM device 101 includes an optical coupler 155, 156, an optical isolator 153, and an optical filter 158, 159, 170 as compared with the transmission device 120 in FIG. 1. The optical filter 158, 159, 170 is an optional component provided in a case where the OSC light is cut off for the purpose of increasing the utilization efficiency of the wavelength.

The transmission device 221 of the ROADM device 201 includes an optical coupler 255, 256, an optical isolator 253, and an optical filter 258, 259, 270 as compared with the transmission device 220 in FIG. 1. The optical filter 258, 259, 270 is an optional component provided in a case where the OSC light is cut off for the purpose of increasing the utilization efficiency of the wavelength.

In the optical transmission system 301, the ROADM device 101 and the ROADM device 201 each have a return back configuration. Specifically, in the ROADM device 101, the SFP for OSC 150 transmits an optical signal from the transmission terminal T to the optical transmission line 10 via the optical coupler 154 and the transmission unit 151. The ROADM device 201 transmits the optical signal from the optical transmission line 10 input via the reception unit 252 and the optical coupler 256 to the optical transmission line 20 via the optical coupler 255 and the transmission unit 251. Then, the ROADM device 101 receives a return back signal input via the reception unit 152 and the optical coupler 157 at the reception terminal R of the SFP for OSC 150.

As similar to this, in the ROADM device 201, the SFP for OSC 250 transmits an optical signal from the transmission terminal T to the optical transmission line 20 via the optical coupler 254 and the transmission unit 251. The ROADM device 101 transmits the optical signal input via the reception unit 152 and the optical coupler 156 to the optical transmission line 10 via the optical coupler 155 and the transmission unit 151. Then, in the ROADM device 201, the SFP for OSC 250 receives a return back signal input via the reception unit 252 and the optical coupler 257 at the reception terminal R.

In the case of the comparative example of the optical transmission system 301 illustrated in FIG. 2, since the return back configuration is adopted in each of the ROADM device 101 and the ROADM device 201, an optical signal is doubly transmitted in the optical transmission lines 10 and 20 as indicated by thick solid arrows and broken arrows.

First Embodiment

Figure 3:
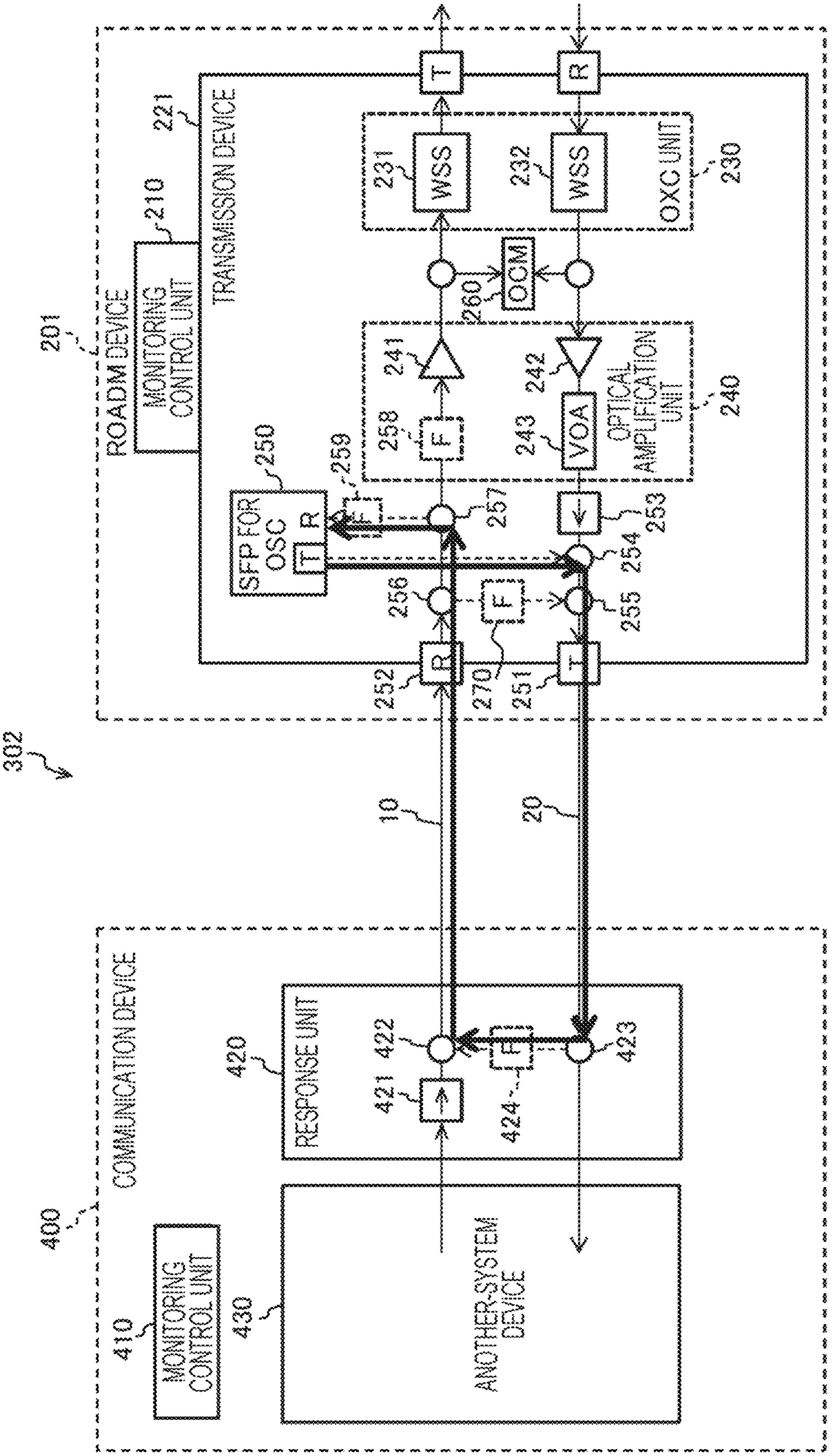
FIG. 3 is an explanatory diagram illustrating an optical transmission system in which an optical transmission system according to a first embodiment of the present invention includes a communication device instead of a ROADM device.

FIG. 3 is an explanatory diagram illustrating an optical transmission system according to the present embodiment, where the optical transmission system includes a communication device instead of a ROADM device. The optical transmission system 302 includes a ROADM device 201 (optical transmission device) that transmits an optical signal to the optical transmission lines 10 and 20, and a communication device 400 connected to the ROADM device 201 via the optical transmission lines 10 and 20.

As illustrated in FIG. 3, the communication device 400 of the optical transmission system 302 includes a monitoring control unit 410, a response unit 420, and another-system device 430.

The monitoring control unit 410 monitors a communication status of the communication device 400. The another-system device 430 includes, for example, a central processing unit (CPU), digital signal processor (DSP), or application specific integrated circuit (ASIC), is provided in the communication device 400, and performs predetermined signal processing. The predetermined signal processing performed by the another-system device 430 is not particularly limited, and may be communication control, image processing, audio processing, data control, or the like.

The response unit 420 is configured to return back the optical signal transmitted from the ROADM device 201 to the ROADM device 201.

The response unit 420 includes an optical coupler 422 and 423, an optical isolator 421, and a filter 424.

The optical coupler 422 and 423 branches the optical signal transmitted from the ROADM device 201. The optical isolator 421 outputs an optical signal from the another-system device 430 to the optical coupler 422 in one direction. Since the optical isolator 421 is provided, the optical signal branched by the optical coupler 422 and 423 is transmitted in the direction of the ROADM device 201. In other words, the optical isolator 421 plays a role of blocking the optical signal branched by the optical coupler 422 passing in the direction of the another-system device 430 and transmitting the optical signal in the direction of the ROADM device 201. The filter 424 is an optional component provided in a case where the OSC light is cut off for the purpose of increasing the utilization efficiency of the wavelength.

In the optical transmission system 302 according to the present embodiment, the SFP for OSC 250 of the transmission device 221 transmits an optical signal from the transmission terminal T to the optical transmission line 20 via the optical coupler 254 and the transmission unit 251. The response unit 420 of the communication device 400 returns back the optical signal input via the optical coupler 423 and the filter 424 to the optical transmission line 10 via the optical coupler 422. In the ROADM device 201, the SFP for OSC 250 receives a return back signal input via the reception unit 252 and the optical coupler 257 from the optical transmission line 10 at the reception terminal R.

As a result, the optical transmission system 302 according to the present embodiment can perform optical communication between the ROADM device 201 and the communication device 400 without electrically terminating the another-system device 430 while securing the OSC function of the ROADM device 201.

The ROADM device 201 includes a monitoring control unit 210. The monitoring control unit 210 monitors optical signals received by the transmission unit 251, the reception unit 252, and the reception terminal R of the SFP for OSC 250.

As a result, for example, when the optical signal (return back signal) returned back from the response unit 420 of the communication device 400 cannot be received by the reception terminal R of the SFP for OSC 250, the monitoring control unit 210 provides notification of a request for APSD to cut off conduction. In this case, the monitoring control unit 210 may cut off conduction of the ROADM device 201 or may cut off conduction of the transmission device 221.

Comparative Example 3

Figure 4:
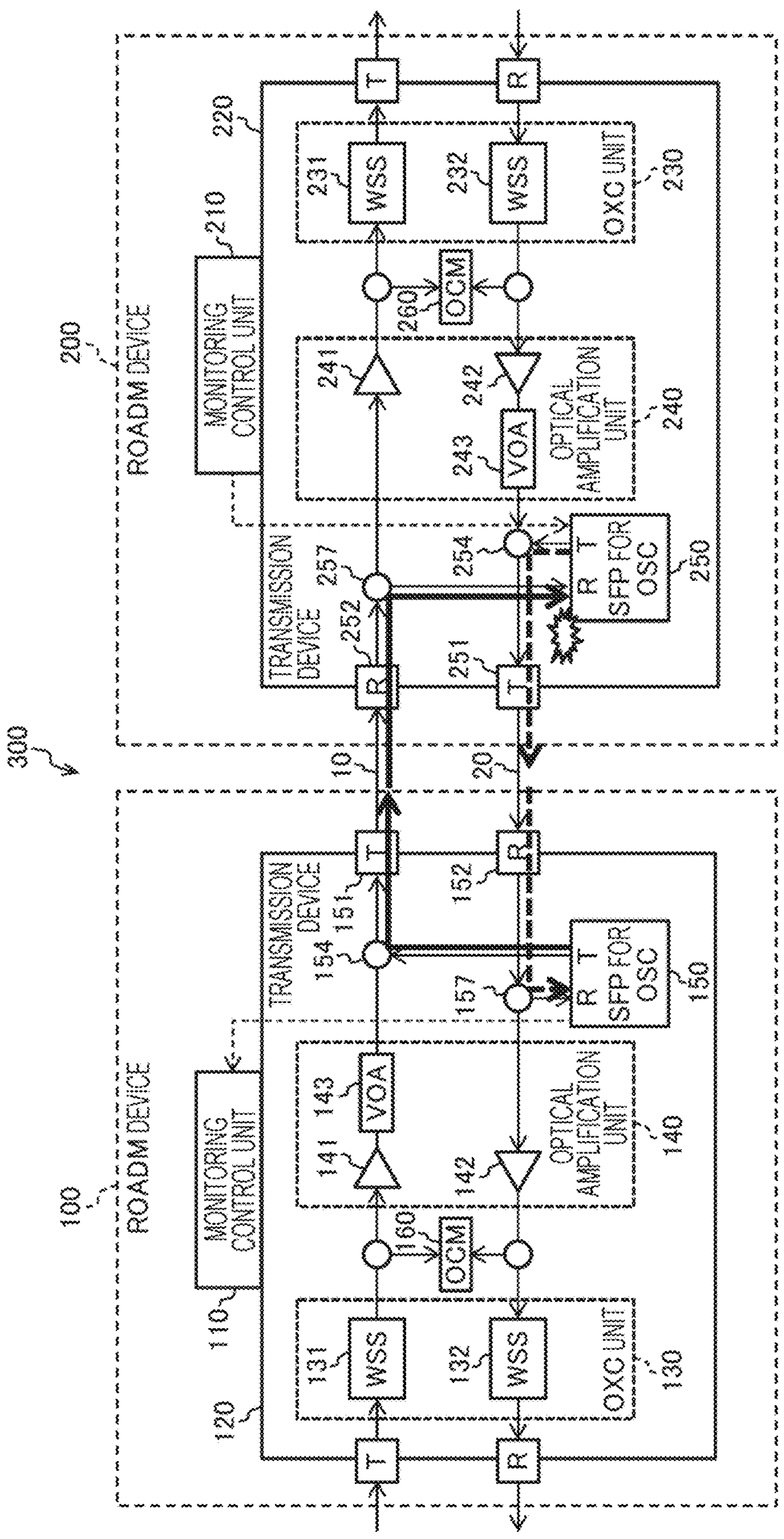
FIG. 4 is an explanatory diagram illustrating a configuration when conventional ROADM devices check communication with each other using an OSC function as a comparative example of an embodiment of the present invention.

FIG. 4 is an explanatory diagram of a comparative example to the present embodiment illustrating a configuration when conventional ROADM devices check communication with each other by an OSC function. The monitoring control signal controlled by the monitoring control unit 110, 210 is described with reference to the explanatory diagram illustrated in FIG. 1.

As illustrated in FIG. 4, in the optical transmission system 300 as a comparative example, the monitoring control unit 110 monitors the SFP for OSC 150, and the monitoring control unit 210 monitors the SFP for OSC 250.

As similar to FIG. 1, in the ROADM device 100, the SFP for OSC 150 transmits an optical signal through the transmission terminal T to the ROADM device 200 via the transmission unit 151 and the optical transmission line 10. In this case, the monitoring control unit 210 monitors whether an optical signal has been received by the transmission unit 251, the reception unit 252, and the reception terminal R of the SFP for OSC 250.

For example, when the optical fiber is disconnected in the optical transmission line 10 and the monitoring control unit 210 detects that the SFP for OSC 250 cannot receive an optical signal at the reception terminal R, the SFP for OSC 250 notifies the reception terminal R of the SFP for OSC 150 of the APSD request through the transmission terminal T via the transmission unit 251 and the optical transmission line 20. Specifically, the monitoring control unit 210 superimposes a signal indicating a request for APSD, which is a monitoring control signal, on the optical signal and transmits the superimposed signal to the monitoring control unit 110.

The monitoring control unit 110 monitors the reception terminal R of the SFP for OSC 150. When the SFP for OSC 150 receives a signal indicating a superimposed APSD request at the reception terminal R, the monitoring control unit accepts the APSD request. In response to the reception of the APSD request, the monitoring control unit 110 cuts off conduction of the ROADM device 100 or the transmission device 120.

Comparative Example 4

Figure 5:
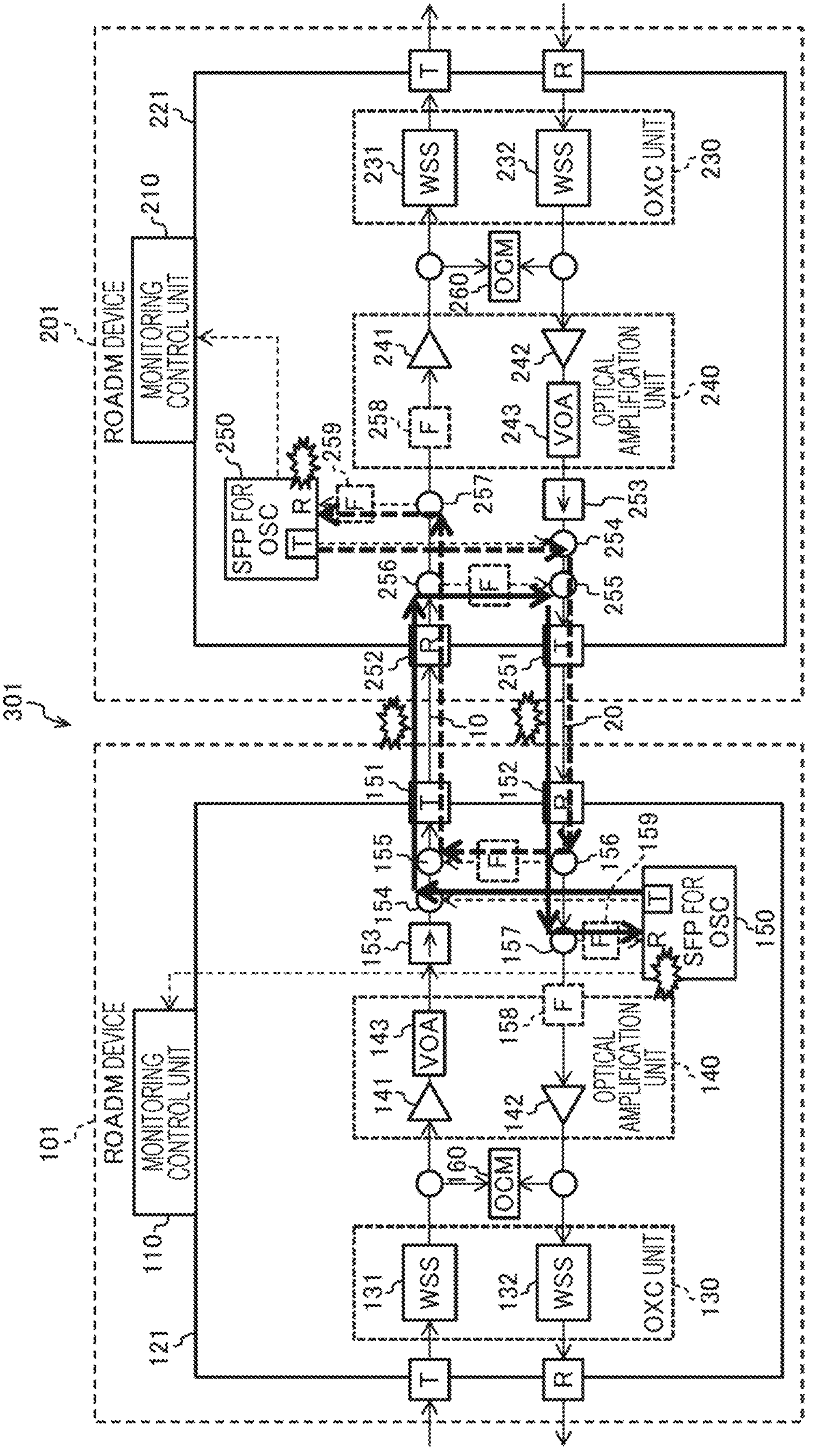
FIG. 5 is an explanatory diagram illustrating a configuration when conventional ROADM devices communicate with each other in a return back configuration using an OSC function as a comparative example of an embodiment of the present invention.

FIG. 5 is an explanatory diagram illustrating a configuration when conventional ROADM devices communicate with each other in a return back configuration by an OSC function as a comparative example to the present embodiment. An optical signal monitored by the monitoring control unit 110, 210 is described with reference to the explanatory diagram illustrated in FIG. 2.

As illustrated in FIG. 5, in the optical transmission system 301 as a comparative example, the monitoring control unit 110 monitors the SFP for OSC 150, and the monitoring control unit 210 monitors the SFP for OSC 250.

In FIG. 5, as described in FIG. 2, the SFP for OSC 150 of the ROADM device 101 transmits an optical signal through the transmission terminal T to the optical transmission line 10 via the optical coupler 154 and the transmission unit 151 as indicated by a thick solid arrow. As indicated by the thick solid arrow, the ROADM device 201 transmits the optical signal input via the reception unit 252 and the optical coupler 256 to the optical transmission line 20 via the optical coupler 255 and the transmission unit 251. Then, in the ROADM device 101, as indicated by the thick solid arrow, the SFP for OSC 150 receives the return back signal input via the reception unit 152 and the optical coupler 157 to the reception terminal R.

As similar to this, in the ROADM device 201, the SFP for OSC 250 transmits an optical signal from the transmission terminal T to the optical transmission line 20 via the optical coupler 254 and the transmission unit 251 as indicated by a broken arrow. As indicated by a broken arrow, the ROADM device 101 transmits the optical signal input via the reception unit 152 and the optical coupler 156 to the optical transmission line 10 via the optical coupler 155 and the transmission unit 151. Then, in the ROADM device 201, as indicated by a broken arrow, the SFP for OSC 250 receives the return back signal input via the reception unit 252 and the optical coupler 257 to the reception terminal R.

However, in this comparative example, since both optical signals (OSC signals) indicated by thick solid arrows and broken arrows respectively of the SFP for OSC 150 and the SFP for OSC 250 pass in the same direction for each of the optical transmission lines 10 and 20, it is difficult to transmit and receive optical signals. That is, the SFP for OSC 150 cannot receive the return back signal even when transmitting the optical signal, and the SFP for OSC 250 cannot receive the return back signal even when transmitting the optical signal.

Therefore, the monitoring control unit 110 detects the APSD request due to the occurrence of an error in the optical transmission lines 10 and 20 at the reception terminal R of the SFP for OSC 150. As similar to this, the monitoring control unit 210 detects the APSD request due to the occurrence of an error in the optical transmission lines 10 and 20 at the reception terminal R of the SFP for OSC 250. As a result, in the optical transmission system 301, each of the monitoring control unit 110 and the monitoring control unit 210 cuts off conduction between the ROADM device 101 and the ROADM device 201, or cuts off conduction between the transmission device 121 and the transmission device 221.

Second Embodiment

Figure 6:
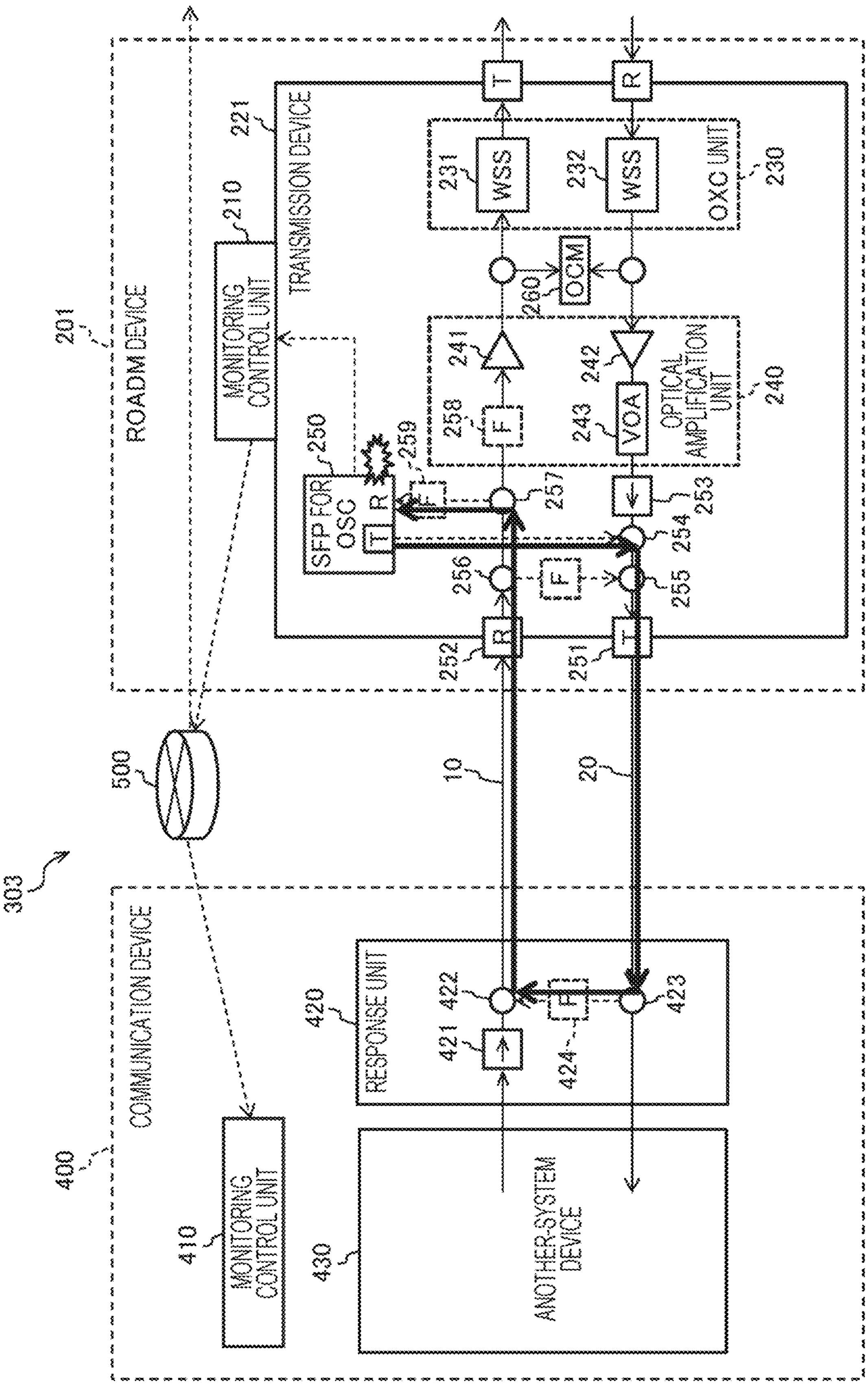
FIG. 6 is an explanatory diagram illustrating a configuration in which the optical transmission system illustrated in FIG. 3 is connected via a network as a second embodiment of the present invention.

FIG. 6 is an explanatory diagram illustrating a configuration in which the optical transmission system illustrated in FIG. 3 is connected via a network as a second embodiment. The explanatory diagram illustrated in FIG. 6 is different from the explanatory diagram of FIG. 3 in that the communication device 400 and the ROADM device 201 are connected via a network.

As illustrated in FIG. 6, in the optical transmission system 303 according to the present embodiment, the monitoring control unit 410 and the monitoring control unit 210 of the optical transmission system 302 illustrated in FIG. 3 are connected by a network 500.

For example, when the SFP for OSC 250 cannot receive the return back signal returned back from the response unit 420 of the communication device 400 to the reception terminal R, the monitoring control unit 210 according to the present embodiment notifies an external monitoring control unit, for example, the remote centralized monitoring device (not illustrated) via the network 500. In this case, the remote centralized monitoring device notifies the monitoring control unit 410 of the communication device 400 of the APSD request.

As a result, the monitoring control unit 410 can receive an instruction from the remote centralized monitoring device and cut off conduction of the communication device 400. In addition, the remote centralized monitoring device may notify the ROADM device 201 and/or the transmission device 221 of the APSD request via the network 500 to cut off conduction of the ROADM device 201 and/or the transmission device 221.

Comparative Example 5

Figure 7:
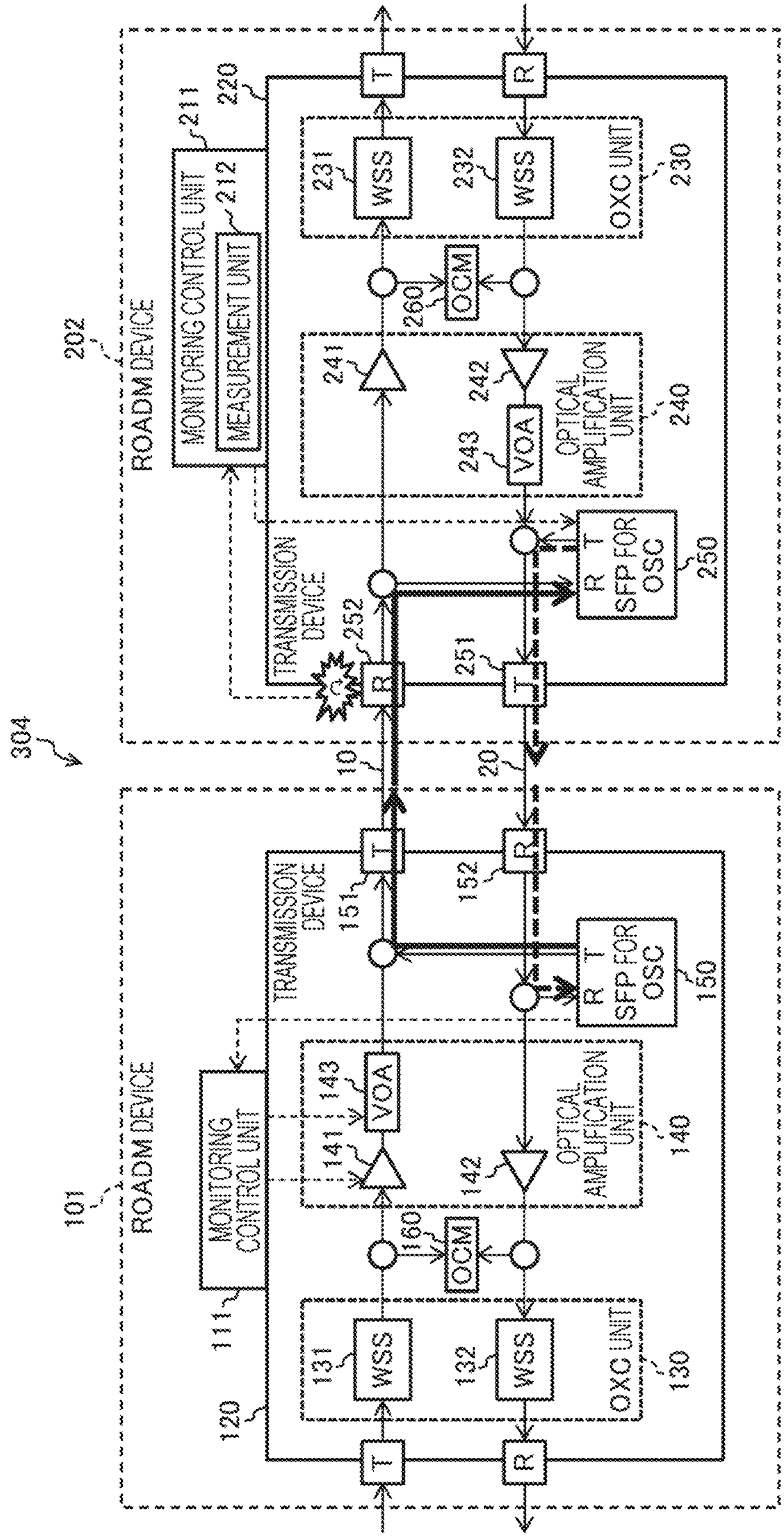
FIG. 7 is an explanatory diagram illustrating a configuration in which conventional ROADM devices perform optical power management by an OSC function as a comparative example of an embodiment of the present invention.

FIG. 7 is an explanatory diagram illustrating a configuration of a comparative example to the present embodiment, in which configuration the conventional ROADM devices perform the optical power management using an OSC function. In this comparative example, an example in which the monitoring control unit 210 measures the optical power of the reception unit 252 is described with reference to the explanatory diagram illustrated in FIG. 1.

As illustrated in FIG. 7, the optical transmission system 304 as a comparative example corresponds to the configuration of the optical transmission system 300 (FIG. 1), and is different in that the monitoring control unit 211 of the ROADM device 202 includes a measurement unit 212.

When the ROADM device 202 receives an optical signal transmitted from the transmission terminal T by the SFP for OSC 150 of the ROADM device 101 as indicated by a thick solid arrow, the measurement unit 212 measures optical power of the received optical signal. The measurement unit 212 constantly measures and observes optical power at the transmission unit 251, the reception unit 252, and the reception terminal R of the SFP for OSC 250.

Specifically, the ROADM device 101 transmits an optical signal from the transmission terminal T of the SFP for OSC 150 to the ROADM device 202. It is assumed that the measurement unit 212 of the monitoring control unit 211 of the ROADM device 202 detects, for example, that the received optical power has decreased at the reception unit 252. In this case, the monitoring control unit 211 superimposes a monitoring control signal for increasing optical power on the optical signal, and the SFP for OSC 250 transmits the superimposed signal from the transmission terminal T to the ROADM device 101 as indicated with a broken arrow.

In the comparative example illustrated in FIG. 7, the monitoring control unit 211 superimposes a monitoring control signal for increasing optical power on the optical signal, and transmits the superimposed signal from the transmission terminal T of the SFP for OSC 250 to the reception terminal R of the SFP for OSC 150 of the ROADM device 101 as indicated by a broken arrow.

When the SFP for OSC 150 receives, at the reception terminal R, the monitoring control signal for increasing the optical power of the reception unit 252, the monitoring control unit 111 of the ROADM device 101 controls the post-amplifier 141 and the VOA 143 to increase transmission power (optical power) of the optical signal to be transmitted.

The monitoring control unit 211 may measure a loss in a transmission path between the ROADM device 101 and the ROADM device 202 (span loss measurement), and transmit a monitoring control signal for adjusting levels of the post-amplifier 141 and the VOA 143 to the monitoring control unit 111 in accordance with the span loss.

Comparative Example 6

Figure 8:
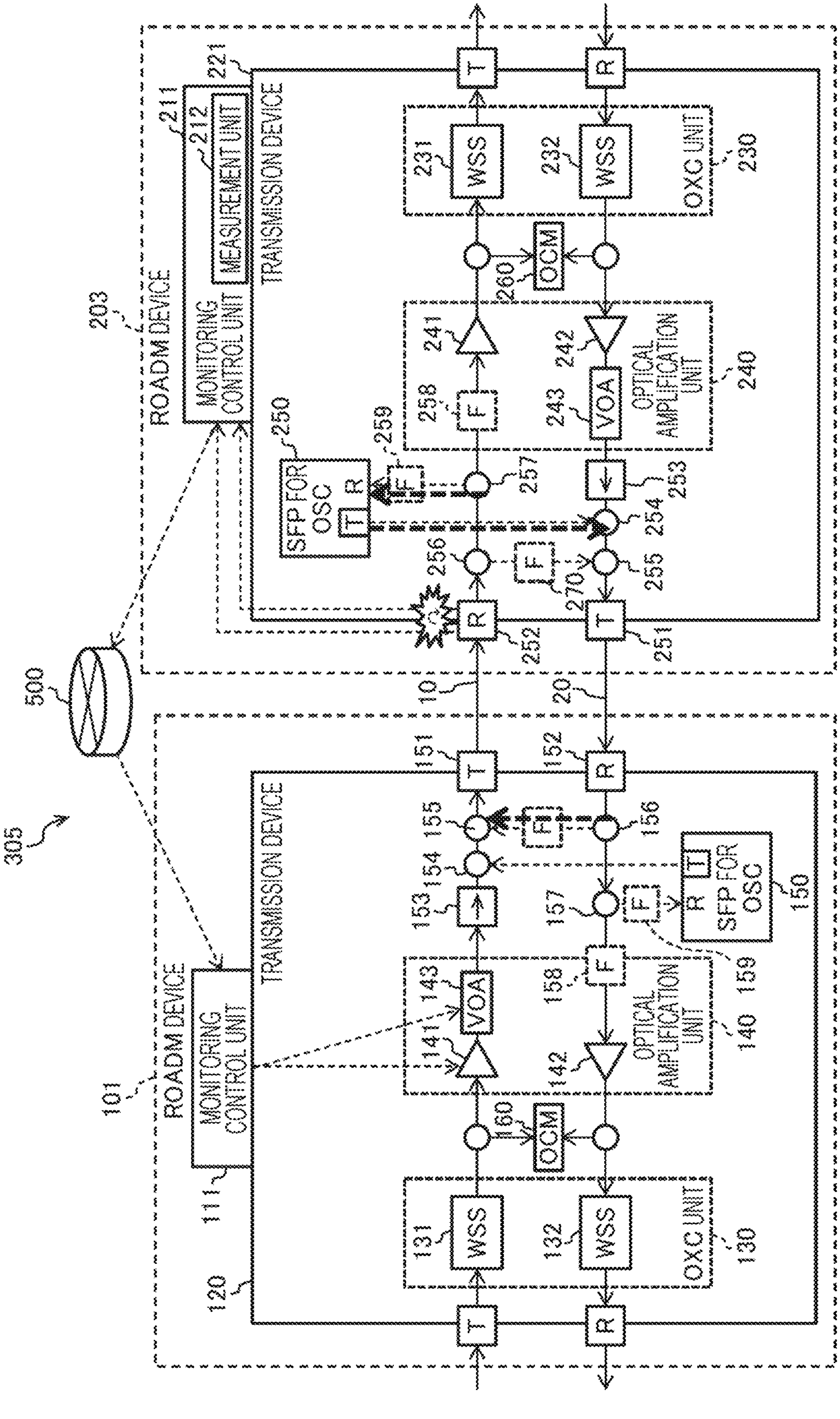
FIG. 8 is an explanatory diagram illustrating a configuration in which conventional ROADM devices perform optical power management in a return back configuration as a comparative example of an embodiment of the present invention.

FIG. 8 is an explanatory diagram illustrating a configuration in which the conventional ROADM devices perform optical power management in the return back configuration as a comparative example to the present embodiment. The monitoring control unit 211 and the monitoring control unit 111 of the optical transmission system 305 illustrated in FIG. 8 are connected by a network 500.

As illustrated in FIG. 8, in an optical transmission system 305 as a comparative example, the monitoring control unit 211 of the ROADM device 203 is connected to an external monitoring control unit, for example, a remote centralized monitoring device (not illustrated) via a network 500 unlike the optical transmission system 304 (FIG. 7).

In FIG. 8, in the ROADM device 101 and the ROADM device 203, as described in FIG. 5, the SFP for OSC 150 and the SFP for OSC 250 cannot transmit and receive optical signals. Therefore, the remote centralized monitoring device performs, on the monitoring control unit 111 of the ROADM device 101, control to increase transmission power to be transmitted by controlling the post-amplifier 141 and the VOA 143 so as to increase optical power at the reception unit 252 of the ROADM device 203.

The monitoring control unit 211 may measure a loss at a transmission path between the ROADM device 101 and the ROADM device 203 (span loss measurement), and cause the remote centralized monitoring device to let the monitoring control unit 111 adjust levels of the post-amplifier 141 and the VOA 143 in accordance with the span loss.

Third Embodiment

Figure 9:
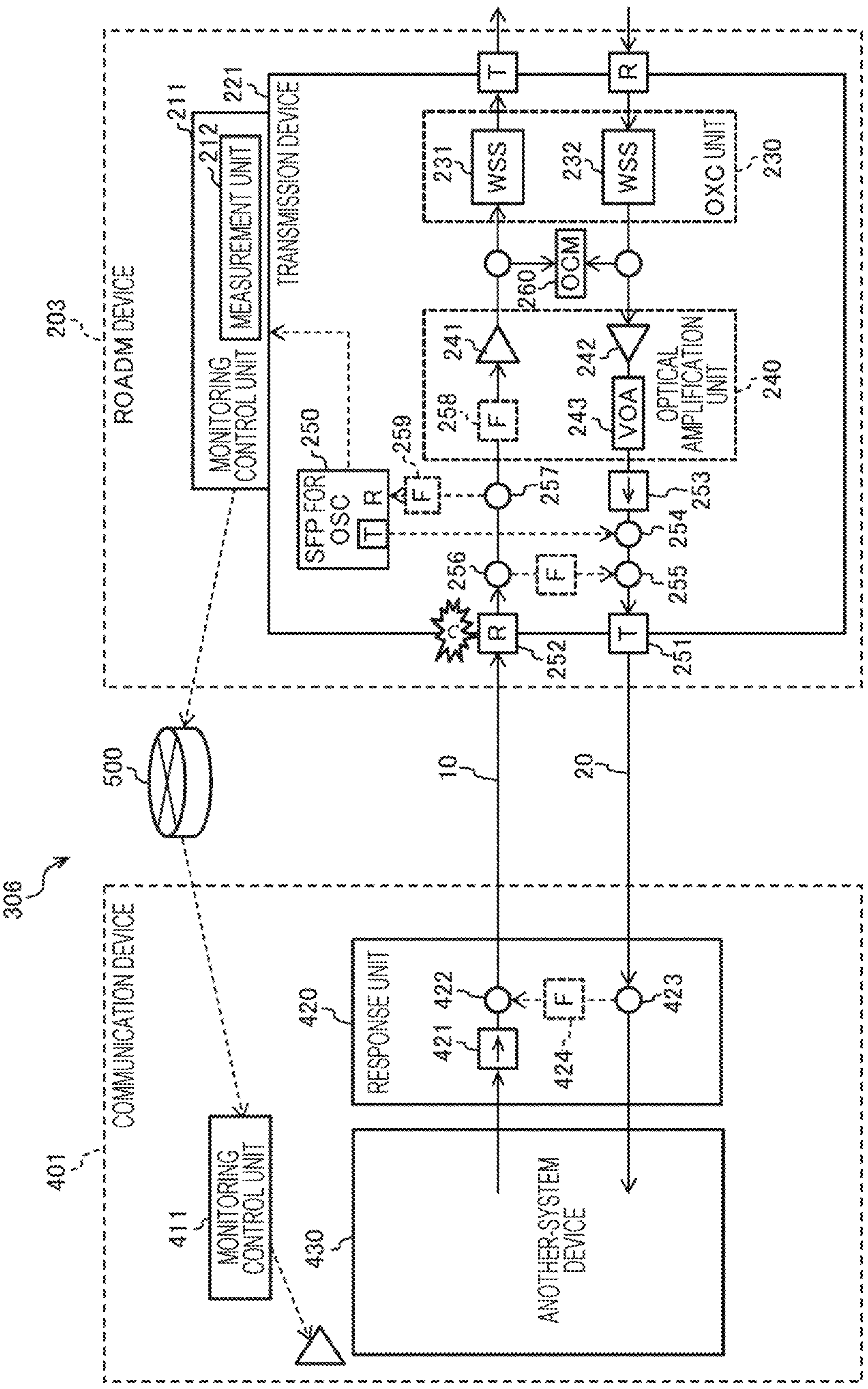
FIG. 9 is an explanatory diagram in which the communication device illustrated in FIG. 6 is applied to the optical transmission system illustrated in FIG. 8 as a third embodiment of the present invention.

FIG. 9 is an explanatory diagram in which the communication device illustrated in FIG. 6 is applied to the optical transmission system illustrated in FIG. 8 as a third embodiment. The explanatory diagram illustrated in FIG. 9 is different from the explanatory diagram of FIG. 8 in that a communication device 401 is provided instead of the ROADM device 101.

As illustrated in FIG. 9, in the optical transmission system 306 according to the present embodiment, the communication device 401 is provided instead of the ROADM device 101 in the optical transmission system 305 illustrated in FIG. 8.

The monitoring control unit 211 of the ROADM device 203 includes a measurement unit 212 that measures the optical power of the return back signal returned back by the response unit 420. When the optical power of the return back signal measured by the measurement unit 212 is lost, the monitoring control unit 211 notifies the remote centralized monitoring device via the network 500, and causes the monitoring control unit 411 to amplify the transmission power of the return back signal and then perform transmission.

As a result, the communication device 401 can increase the optical power of the return back signal of the response unit 420 by the monitoring control unit 411 receiving an instruction from the remote centralized monitoring device and performing amplifier control to increase the transmission power. The monitoring control unit 411 only needs to be able to increase the transmission power of the response unit 420, and the method of amplifier control is not limited to any one.

Fourth Embodiment

Figure 10:
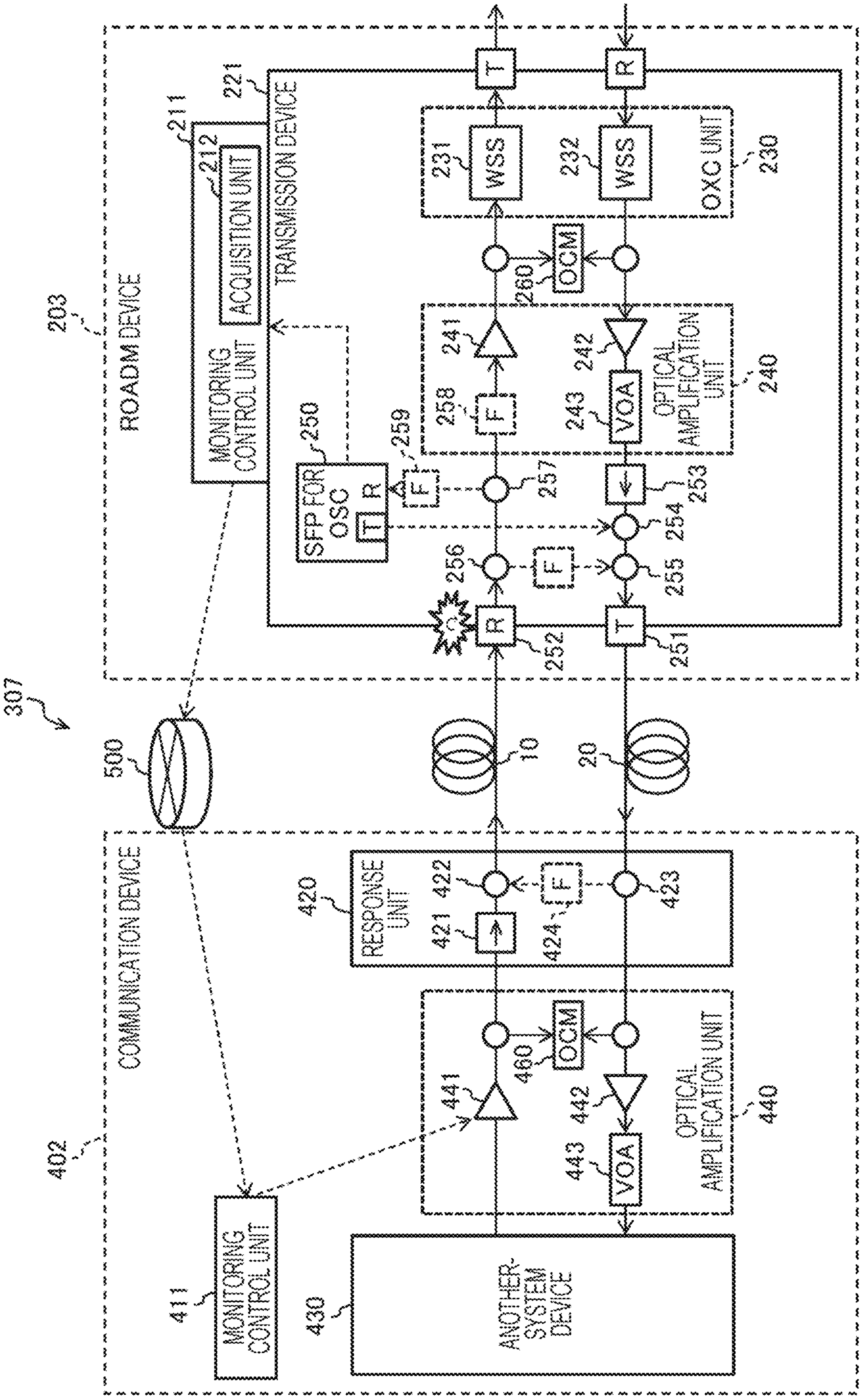
FIG. 10 is an explanatory diagram illustrating a configuration in which the communication device of the optical transmission system illustrated in FIG. 9 includes an optical amplification unit as a fourth embodiment of the present invention.

FIG. 10 is an explanatory diagram illustrating a configuration in which the communication device of the optical transmission system illustrated in FIG. 9 includes an optical amplification unit as a fourth embodiment. The explanatory diagram illustrated in FIG. 10 is different from the explanatory diagram of FIG. 9 in that the communication device 402 further includes an optical amplification unit 440.

As illustrated in FIG. 10, in the optical transmission system 307 according to the present embodiment, the optical amplification unit 440 is provided in the communication device 401 of the optical transmission system 306 illustrated in FIG. 9.

The optical amplification unit 440 has a function of amplifying transmission power for transmitting the return back signal. The optical amplification unit 440 includes a post-amplifier 441, a pre-amplifier 442, a VOA 443, and an OCM 460.

The post-amplifier 441 is equivalent to the post-amplifier 141, the pre-amplifier 442 is equivalent to the pre-amplifier 142, the VOA 443 is equivalent to the VOA 143, and the OCM 460 is equivalent to the OCM 160.

The optical amplification unit 440 receives an instruction from the monitoring control unit 411, amplifies transmission power for the optical signal received by the response unit 420 via the optical transmission line 20, and transmits the optical signal as a return back signal via the optical transmission line 10.

As described above, in the communication device 402, the monitoring control unit 411 can receive an instruction from the remote centralized monitoring device and increase the transmission power for transmitting the return back signal.

Comparative Example 7

Figure 11:
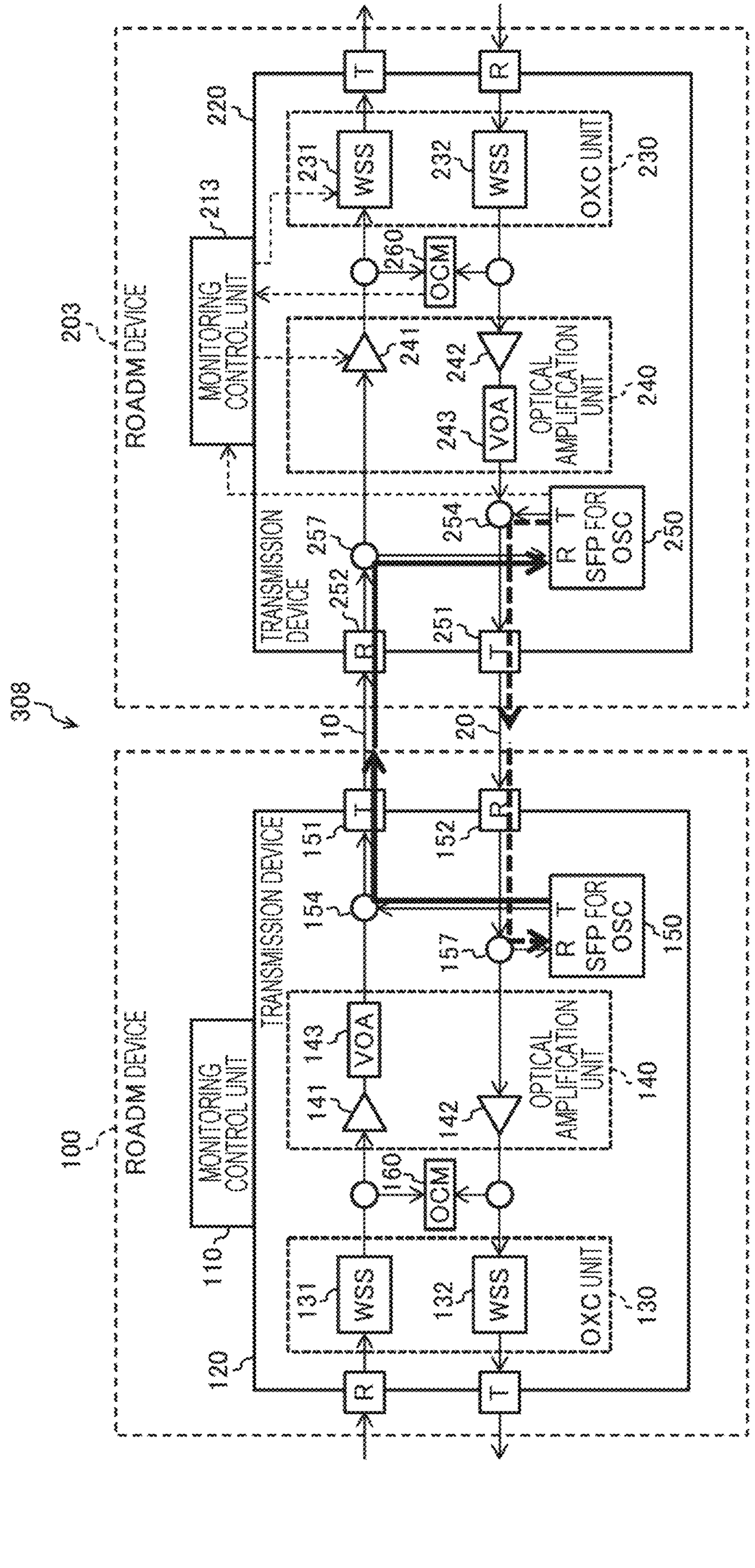
FIG. 11 is an explanatory diagram illustrating a configuration when wavelength information is managed by an OCM between conventional ROADM devices as a comparative example of an embodiment of the present invention.

FIG. 11 is an explanatory diagram illustrating a configuration when wavelength information is managed by an OCM between conventional ROADM devices as a comparative example of the present embodiment.

As illustrated in FIG. 11, in the optical transmission system 308 as a comparative example, the monitoring control unit 213 of the ROADM device 203 acquires a wavelength and the number of wavelengths to be used as wavelength information of a node (ROADM device 100) from an optical signal received by the reception terminal R of the SFP for OSC 250.

For example, the monitoring control unit 213 controls the post-amplifier 241 of the optical amplification unit 240 and the WSS 231 of the OXC unit 230 on the basis of the wavelength information of the node (ROADM device 100) received at the reception terminal R of the SFP for OSC 250. Specifically, the monitoring control unit 213 opens a wavelength port and/or adjusts the amplifier on the basis of the acquired wavelength information.

In addition, the OCM 260 measures a wavelength spectrum of the optical signal received from the ROADM device 100, and notifies the monitoring control unit 213 of the wavelength information of a used wavelength and the number of wavelengths. As a result, the monitoring control unit 213 controls the OXC unit 230 on the basis of the wavelength information measured by the OCM 260, and controls the wavelength port to be used.

For example, when the wavelength to be acquired cannot be measured by the OCM 260, the monitoring control unit 213 closes the wavelength port of the wavelength that cannot be measured by the WSS 231. In addition, the monitoring control unit 213 measures the used wavelength, and in a case where the wavelength tilt is large, corrects the variation of the optical power for each wavelength, and performs control to equalize the wavelength tilt.

Comparative Example 8

Figure 12:
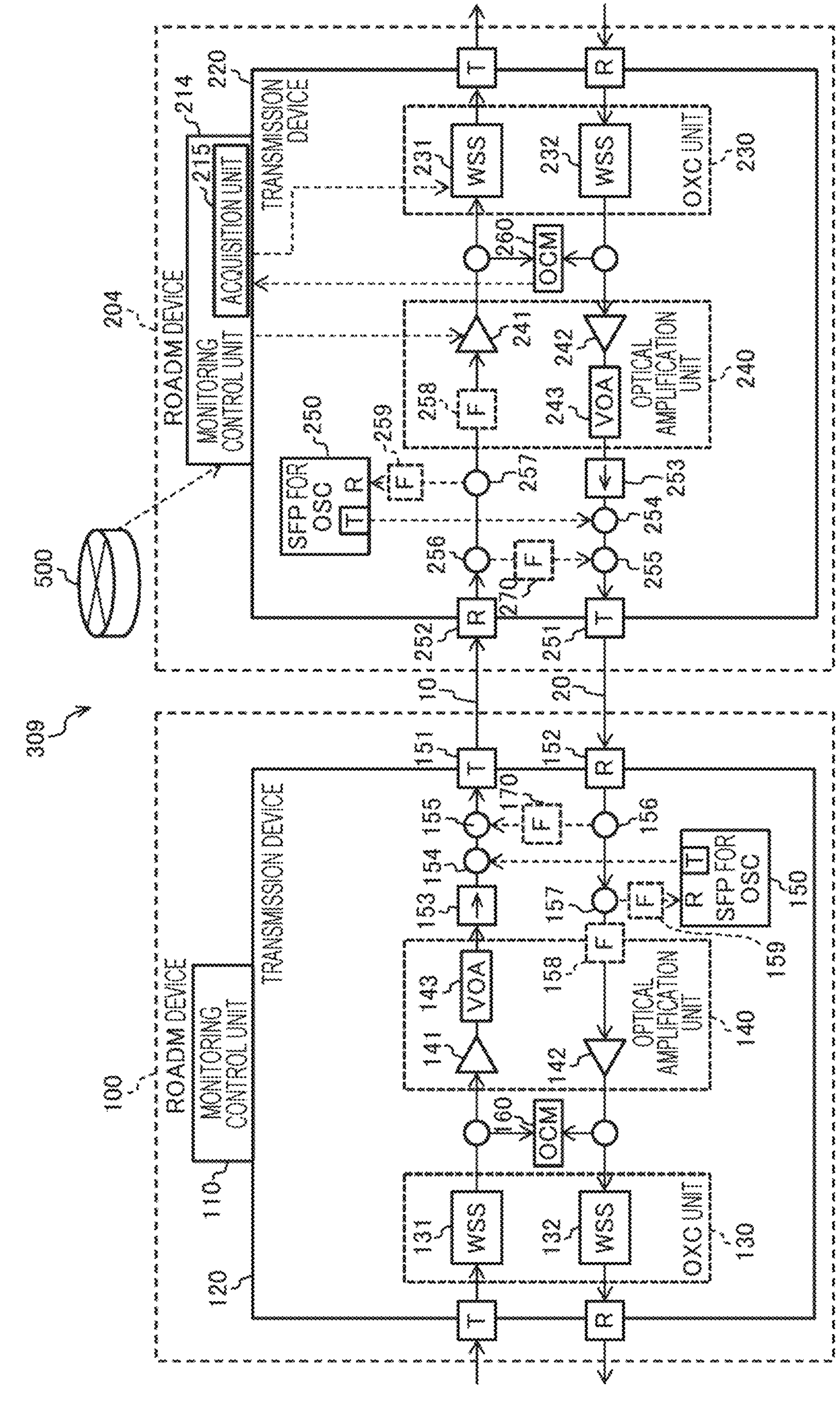
FIG. 12 is an explanatory diagram illustrating a configuration in which a monitoring control unit acquires wavelength information from a remote centralized monitoring device between conventional ROADM devices as a comparative example of the an embodiment of the present invention.

FIG. 12 is an explanatory diagram illustrating a configuration of a comparative example to the present embodiment, in which example a monitoring control unit acquires wavelength information from a remote centralized monitoring device between conventional ROADM devices. In FIG. 12, the monitoring control unit 214 includes an acquisition unit 215 that acquires a used wavelength and the number of wavelengths of a node (ROADM device 100) as wavelength information from the remote centralized monitoring device via the network 500.

In this case, the monitoring control unit 214 acquires wavelength information of the used wavelength and the number of wavelengths of the node from the remote centralized monitoring device, and acquires measured wavelength information of the used wavelength and the number of wavelengths from the OCM 260.

In the case of FIG. 12, the monitoring control unit 214 collates the wavelength information acquired by the acquisition unit 215 from the remote centralized monitoring device with the measured wavelength information measured by the OCM 260.

As similar to FIG. 11, when the wavelength to be acquired cannot be measured by the OCM 260, the monitoring control unit 214 closes the wavelength port at the WSS 231 of the wavelength that cannot be acquired. In addition, the monitoring control unit 214 measures the used wavelength by the OCM 260, and in a case where the wavelength tilt is large, corrects the variation of the optical power for each wavelength, and performs control to equalize the wavelength tilt.

Fourth Embodiment

Figure 13:
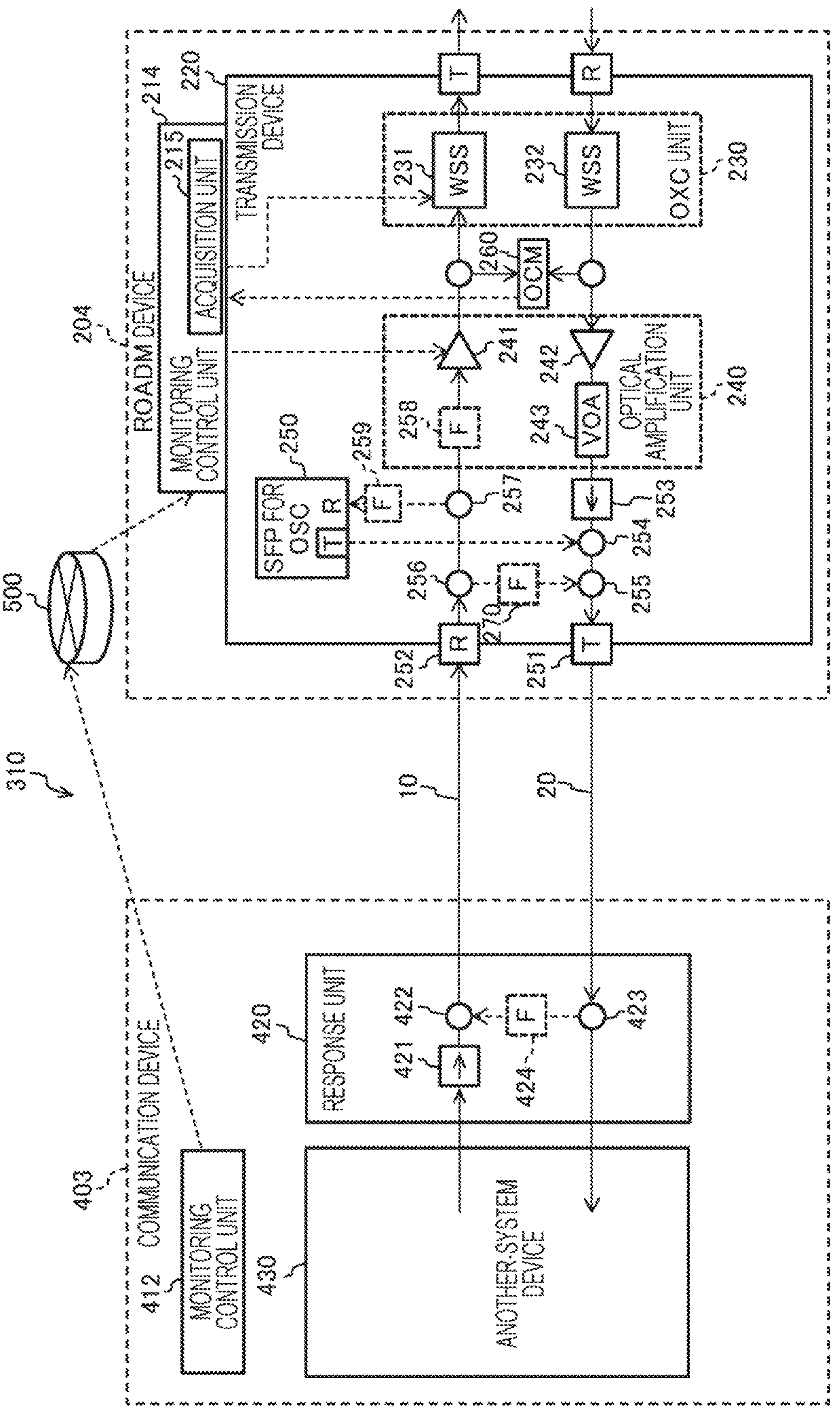
FIG. 13 is an explanatory diagram in which the communication device of FIG. 6 is applied to the optical transmission system illustrated in FIG. 12 as a fourth embodiment of the present invention.

FIG. 13 is an explanatory diagram illustrating a configuration in which the communication device of FIG. 6 is applied to the optical transmission system illustrated in FIG. 12 as a fourth embodiment. That is, the optical transmission system 310 illustrated in FIG. 13 is a combination of the communication device 403 corresponding to the communication device 400 illustrated in FIG. 6 and the ROADM device 204 of the optical transmission system 309 illustrated in FIG. 12.

As illustrated in FIG. 13, the communication device 403 is connected to the ROADM device 204 via the network 500. In this case, in the monitoring control unit 412, the response unit 420 of the communication device 403 as a node (communication device 403) transmits wavelength information to be returned back to the monitoring control unit 214 via the remote centralized monitoring device. Since the monitoring control unit 214 includes the acquisition unit 215, the used wavelength and the number of wavelengths of the node (communication device 403) are acquired as the wavelength information.

The ROADM device 204 includes an OCM 260 (optical monitor) that measures a wavelength spectrum of a return back signal returned back by the response unit 420 of the communication device 403, and an OXC unit 230 (optical cross-connect unit) that selects and sets an optical transmission line. The OXC unit 230 includes a WSS 231 and 232 that selects a wavelength in a wavelength spectrum.

The monitoring control unit 214 includes an acquisition unit 215, and the acquisition unit 215 acquires wavelength information regarding a wavelength spectrum transmitted from the communication device 403.

In a case in which the measurement result of the wavelength spectrum measured by the OCM 260 does not match the wavelength information acquired by the acquisition unit 215, the monitoring control unit 214 controls the WSS 231 and 232 in accordance with the measurement result and/or controls the power for each wavelength of the measured wavelength spectrum.

As described above, the monitoring control unit 214 collates the wavelength information acquired by the acquisition unit 215 with the wavelength information measured by the OCM 260. When the wavelength information acquired by the acquisition unit 215 is different from the wavelength information measured by the OCM 260 so that the wavelength to be acquired cannot be measured, the monitoring control unit 214 closes in the WSS 231 the wavelength port of the wavelength that cannot be measured. When the measured optical power of the wavelength varies and the wavelength tilt is large, the monitoring control unit 214 corrects the optical power for each wavelength and performs control to equalize the wavelength tilt.

Effects

Hereinafter, effects of the optical transmission system 302 according to the above embodiments of the present invention and the communication device 400 connected to the ROADM device 200 is described.

An optical transmission system 302 according to the above embodiments of the present invention includes: a ROADM device 201 that transmits and receives an optical signal via an optical transmission line 10 and 20; and a communication device 400 connected to the ROADM device 201 via the optical transmission line 10 and 20, in which the ROADM device 201 includes a SFP for OSC 250 that converts an electrical signal and an optical signal to each other and transmits and receives the optical signal via the optical transmission line 10 and 20, and the communication device 400 includes a response unit 420 that returns back the optical signal transmitted from the ROADM device 201 to the ROADM device 201.

As a result, in the optical transmission system 302 according to the present embodiment, an optical signal is transmitted from the SFP for OSC 250 to the optical transmission line 20. The response unit 420 of the communication device 400 returns back the transmitted optical signal to the ROADM device 201 via the optical transmission line 10. Then, in the ROADM device 201, the SFP for OSC 250 receives the transmitted return back signal.

Accordingly, the optical transmission system 302 according to the present embodiment can perform optical communication between the ROADM device 201 and the communication device 400 without electrically terminating the another-system device 430 while securing the OSC function of the ROADM device 201.

Furthermore, the optical transmission system 303 according to the above embodiments of the present invention further includes a monitoring control unit 210 that monitors an optical signal. When the monitoring control unit 210 cannot receive the return back signal returned back from the communication device 400, the monitoring control unit 210 notifies the communication device 400 of a request for auto power shut down (APSD) to cut off conduction via the network.

As a result, in the optical transmission system 302, conduction of the communication device 400 can be cut off by the monitoring control unit 410.

In the optical transmission system 306 according to the above embodiments of the present invention, the monitoring control unit 211 further includes the measurement unit 212 that measures optical power of a return back signal obtained by transmitting an optical signal to the communication device 401 by the SFP for OSC 250 and returning back the optical signal by the response unit 420, and in a case where the optical power of the return back signal measured by the measurement unit 212 is lost, the monitoring control unit 211 notifies the communication device 401 via the network to cause the transmission power of the return back signal to be amplified and transmission to be performed.

As a result, the communication device 401 can increase the transmission power of the return back signal of the response unit 420 by a control to increase the transmission power in the monitoring control unit 411.

In the optical transmission system 307 according to the above embodiments of the present invention, the communication device 402 further includes an optical amplification unit 440 that amplifies transmission power for transmitting the return back signal.

As a result, in the communication device 402, the monitoring control unit 411 is able to cause the optical amplification unit 440 to increase the transmission power of the return back signal.

Furthermore, in the optical transmission system 310 according to the above embodiments of the present invention, the ROADM device 204 further includes an OCM 260 that measures a wavelength spectrum of a return back signal returned back by the response unit 420, and an OXC unit 230 that selects and sets an optical transmission line, the OXC unit 230 includes a WSS 231 and 232 that selects a wavelength in a wavelength spectrum, the monitoring control unit 214 includes an acquisition unit 215 that acquires wavelength information regarding a transmitted wavelength spectrum, and, in a case where the measurement result of the wavelength spectrum measured by the OCM 260 does not match the wavelength information acquired by the acquisition unit 215, the monitoring control unit 214 controls the WSS 231 and 232 in accordance with the measurement result and/or controls the power for each wavelength of the measured wavelength spectrum.

As a result, the monitoring control unit 214 can collate the wavelength information acquired by the acquisition unit 215 with the wavelength information measured by the OCM 260. When the wavelength information acquired by the acquisition unit 215 is different from the wavelength information measured by the OCM 260 so that the wavelength to be acquired cannot be measured, the monitoring control unit 214 closes the wavelength port of the wavelength that cannot be measured in the WSS 231. When the measured optical power of the wavelength varies and the wavelength tilt is large, the monitoring control unit 214 corrects the optical power for each wavelength to correct the wavelength tilt.

In the optical transmission system 302 according to the above embodiments of the present invention, the response unit 420 includes the optical coupler 422 and 423 that branches the optical signal transmitted from the ROADM device 201, and the optical isolator 421 connected between the optical coupler 422 and 423 and the another-system device 430 that transmits the optical signal. The optical isolator 421 blocks the optical signal branched by the optical coupler 422 and 423 to the side of the another-system device 430 and transmits the optical signal in the direction of the ROADM device 201.

As a result, the response unit 420 can return back the optical signal input via the optical coupler 423 to the optical transmission line 10 using the optical isolator 421 and the optical coupler 422 without electrically terminating the another-system device 430.

Note that the present invention is not limited to the above-described embodiment, and many modifications can be made by those skilled in the art within the technical idea of the present invention.

REFERENCE SIGNS LIST

- 100, 200 to 204: ROADM device (optical transmission device)
- 110, 210, 211, 213, 214: Monitoring control unit
- 120, 121, 220, 221: Transmission device
- 130, 230: OXC unit (optical cross-connect unit)
- 131, 132, 231, and 232: WSS (wavelength selective switch)
- 140, 240: Optical amplification unit
- 141, 241: Post-amplifier
- 142, 242: Pre-amplifier
- 143, 243: VOA
- 150, 250: SFP for OSC
- 151, 251: Transmission unit
- 152, 252: Reception unit

153, 253, 421: Optical isolator
154, 157, 254, 257: Optical coupler
158, 159, 170, 258, 259, 270: Optical filter
160, 260: OCM (optical monitor)
212: Measurement unit
215: Acquisition unit
300 to 310: Optical transmission system
400 to 403: Communication device
420: Response unit
440: Optical amplification unit
500: Network

What is claimed is:

1. An optical transmission system comprising:

an optical transmission device configured to transmit and receive an optical signal via an optical transmission line; and a communication device connected to the optical transmission device via the optical transmission line, wherein the optical transmission device has:

a function of optical supervisory channel (OSC); and a small form factor pluggable transceiver (SFP) configured to convert an electrical signal and an optical signal to each other and transmits and receives the optical signal via the optical transmission line, and the communication device includes:

a response unit configured to return back the optical signal transmitted from the optical transmission device to the optical transmission device, wherein the response unit configured to include a first optical coupler receiving the optical signal transmitted from the optical transmission device; and a second optical coupler transmitting an optical signal to the optical transmission device, the first optical coupler transmits the received optical signal to an another system device without electrically terminating the another system device and branches to transmit to the second optical coupler the received optical signal; and the second optical coupler transmits the optical signal from the first optical coupler to the optical transmission device.

2. The optical transmission system according to claim 1, wherein the optical transmission device further includes:

a monitoring control unit configured to monitor an optical signal, and when the monitoring control unit cannot receive the optical signal returned back from the communication device, the monitoring control unit is configured to notify the communication device of a request for auto power shut down (APSD) to cut off conduction via a network.

3. The optical transmission system according to claim 2, wherein the monitoring control unit further includes:

a measurement unit configured to measure optical power of a return back signal obtained by transmitting an optical signal to the communication device by the SFP and returning back the optical signal by the response unit, and in a case in which the optical power of the return back signal measured by the measurement unit is lost, the monitoring control unit is configured to notify the communication device of loss of the optical power via the network to cause the return back signal to be amplified in transmission power and to be transmitted.

4. The optical transmission system according to claim 3, wherein the communication device further includes:

an optical amplification unit configured to amplify the transmission power for transmitting the return back signal.

5. The optical transmission system according to claim 2, wherein the optical transmission device further includes:

an optical monitor configured to measure a wavelength spectrum of a return back signal returned back by the response unit; and an optical cross-connect unit configured to select and sets an optical transmission line, the optical cross-connect unit includes:

a wavelength selective switch configured to select a wavelength in the wavelength spectrum, the monitoring control unit further includes:

an acquisition unit configured to acquire wavelength information regarding a wavelength spectrum transmitted, and in a case in which a measurement result of the wavelength spectrum measured by the optical monitor does not match the wavelength information acquired by the acquisition unit, the monitoring control unit is configured to control the wavelength selective switch in accordance with the measurement result and/or controls power for each wavelength of the wavelength spectrum that has been measured.

6. The optical transmission system according to claim 1, wherein the response unit includes:

an optical isolator connected between the second optical coupler and another-system device configured to transmit the optical signal, and the optical isolator configured to:

block the optical signal branched by the first optical coupler toward the another-system device and transmit the branched optical signal in a direction of the optical transmission device.

7. A transmission method of an optical transmission system including an optical transmission device that has a function of optical supervisory channel (OSC) and transmits an optical signal via an optical transmission line, and a communication device including a first optical coupler and a second optical coupler and connected to the optical transmission device via the optical transmission line, the transmission method comprising steps of:

converting an electrical signal into an optical signal and transmitting the optical signal to the communication device via the optical transmission line, performed by the optical transmission device;

receiving the optical signal transmitted from the optical transmission device and transmitting the received optical signal to an another system device without electrically terminating the another system device by the first optical coupler; and branching by the first optical coupler the optical signal received from the optical transmission device to the second optical coupler, and returning back the optical signal received from the optical transmission device to the optical transmission device by the second optical coupler, performed by the communication device; and receiving a return back signal returned back from the communication device, performed by the optical transmission device.

8. The optical transmission system according to claim 2, wherein the communication device further includes:

a monitoring control unit configured to, when a return back signal returned back by the response unit to the optical transmission device is cut off, receive an instruction for auto power shut down (APSD) to cut off conduction that is notified by the optical transmission device.

9. A communication device connected to an optical transmission device having a function of optical supervisory channel (OSC) via an optical transmission line, the communication device comprising:

a response unit configured to return back as a return back signal an optical signal transmitted from the optical transmission device to the optical transmission device, wherein the response unit configured to include a first optical coupler receiving the optical signal transmitted from the optical transmission device; and a second optical coupler transmitting an optical signal to the optical transmission device, the first optical coupler transmits the received optical signal to an another system device without electrically terminating the another system device and branches to transmit the received optical signal to the second optical coupler; and the second optical coupler transmits as the return back signal the optical signal branched from the first optical coupler to the optical transmission device.

10. The communication device according to claim 9, wherein the response unit includes an optical isolator, the optical isolator being connected between the second optical coupler and another-system device;

the optical isolator being configured to:

block the optical signal branched by the first optical coupler from being transmitted toward the another-system device and transmit the branched optical signal in a direction of the optical transmission device.

11. The communication device according to claim 9, further comprising:

a monitoring control unit configured to receive an instruction for auto power shut down (APSD) to cut off conduction, the instruction being notified by the optical transmission device when the return back signal is cut off.

12. The communication device according to claim 9, further comprising:

an optical amplification unit configured to amplify transmission power for transmitting the return back signal in response to a notification of loss of optical power of the return back signal, the notification being sent by the optical transmission device when the optical power of the return back signal is lost.

* * * * *